United States Patent [19]
Shindo et al.

[11] Patent Number: 5,231,614
[45] Date of Patent: Jul. 27, 1993

[54] MAGNETO-OPTICAL ERASER

[75] Inventors: Koji Shindo; Yoshio Fujii, both of Amagasaki, Japan

[73] Assignee: Mitsubishi Denki Kabushiki Kaisha, Tokyo, Japan

[21] Appl. No.: 837,704

[22] Filed: Feb. 20, 1992

Related U.S. Application Data

[63] Continuation of Ser. No. 462,730, Jan. 9, 1990, abandoned.

[30] Foreign Application Priority Data

Jan. 13, 1989 [JP] Japan .................... 1-6850
Apr. 28, 1989 [JP] Japan .................. 1-111129

[51] Int. Cl.⁵ .................. G11B 11/10; G11B 13/04
[52] U.S. Cl. .................. 369/13; 360/59; 365/122
[58] Field of Search .......... 369/13; 360/114, 59; 365/122

[56] References Cited

U.S. PATENT DOCUMENTS

| | | | |
|---|---|---|---|
| 3,176,278 | 3/1965 | Mayer | 360/59 |
| 3,631,415 | 12/1971 | Aagard et al. | 360/59 X |
| 4,686,661 | 8/1987 | Isaka | 360/59 X |
| 4,788,671 | 11/1988 | Kanda | 369/13 |
| 4,926,403 | 5/1990 | Tsuyuguchi et al. | 360/114 X |

FOREIGN PATENT DOCUMENTS

| | | |
|---|---|---|
| 3630765A1 | 3/1988 | Fed. Rep. of Germany . |
| 56-37836 | 4/1981 | Japan . |
| 61-172235 | 8/1986 | Japan . |
| 63-308755 | 12/1988 | Japan . |

Primary Examiner—Stuart S. Levy
Assistant Examiner—Joseph A. Rhoa

[57] ABSTRACT

In a magneto-optical eraser, information recorded on a magnetic layer of a magneto-optical recording medium is erased or initialized by applying light over the magneto-optical recording medium from a light source (13,43) in a reflector to heat the magneto-optical recording medium and also by supplying a magnetic field to the magneto-optical recording medium along its axis of easy magnetization. In one form, a plurality of light sources (13) may be disposed in the surface of a single reflector (12). Alternatively, the magneto-optical recording medium may be double-faced, and a light source and reflector may be disposed on each side of the double-face recording medium. A pre-heater (52) may increase the temperature within a glass housing (50,51) to a temperature less than the softening point of the medium substrate.

15 Claims, 4 Drawing Sheets

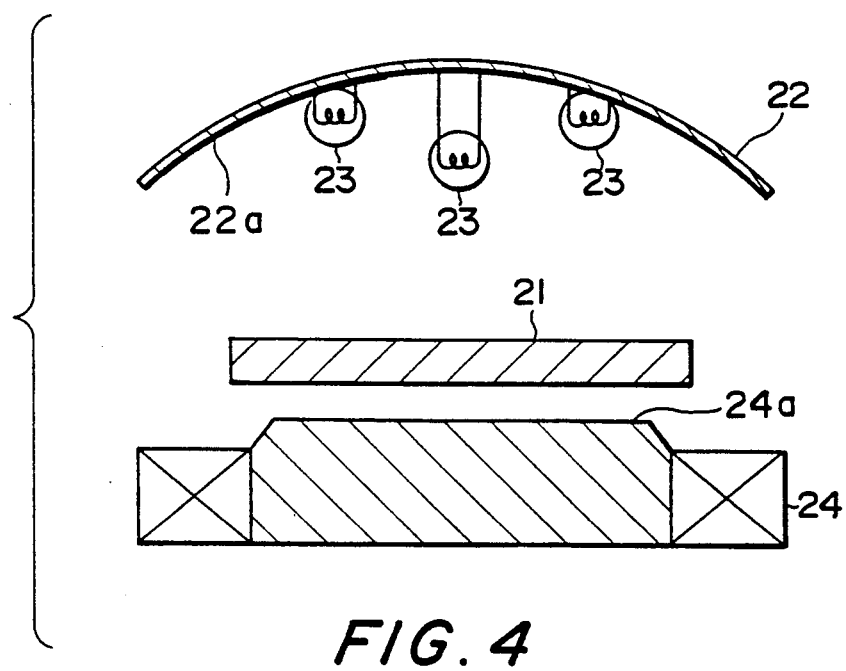
FIG. 3
FIG. 4
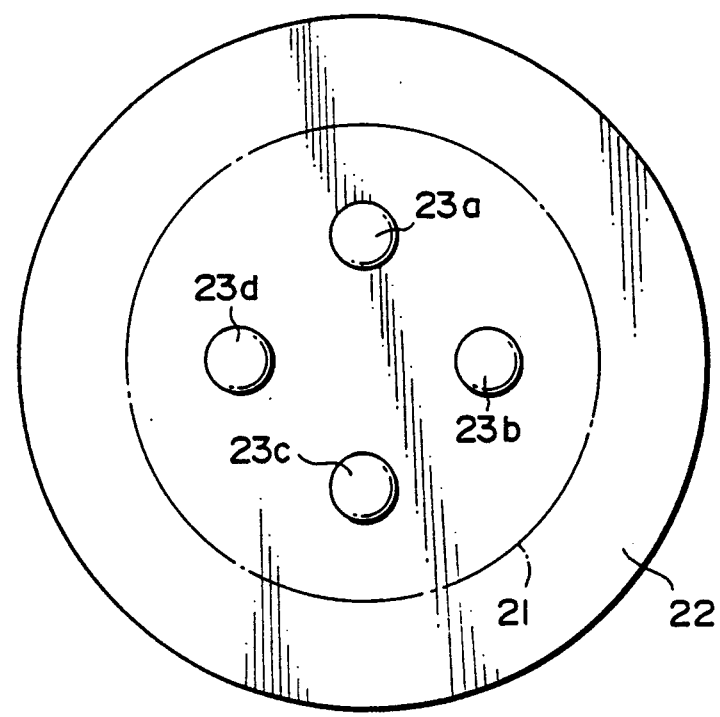

MAGNETO-OPTICAL ERASER

This application is a continuation of application Ser. No. 07/462,730 filed on Jan. 9, 1990, now abandoned.

BACKGROUND OF THE INVENTION

1. Field of the Invention

This invention relates to a magneto-optical eraser for erasing or initializing information which is recorded on a magneto-optical recording medium by utilizing a light beam and a magnetic field.

2. Description of the Related Art

FIG. 9 of the accompanying drawings shows a magneto-optical eraser disclosed in our co-assigned Japanese Patent Application No. 144389/1987. In FIG. 9, an electromagnet 4 is located at a position spaced a suitable distance from a parabolic surface 2a of a reflector 2 so that a magnetic pole 4a of the electromagnet 4 confronts the reflector 2. A single light source 3 is disposed inwardly of the parabolic surface 2a of the reflector 2. In this prior arrangement, a magneto-optical recording medium 1 is disposed close to the magnetic pole 4a of the electromagnet 4. The magneto-optical recording medium 1 is a medium for recording and reproducing information by utilizing a light beam and a magnetic field, and includes a magnetic layer such as of a TbFeCo film having the axis of easy magnetization in a direction perpendicular to the film surface. When light emitted from the light source 3 strikes on the magneto-optical recording medium 1, this recording medium is heated, and at the same time, a perpendicular magnetic field of over 5,000 Oe is given over the entire surface of the magneto-optical recording medium 1 due to the electromagnet 4.

By this prior magneto-optical eraser, information recorded on the magneto-optical recording medium is erased in the following manner.

Firstly, the electromagnet 4 is energized so as to apply a perpendicular magnetic field of over 5,000 Oe over the entire surface of the magneto-optical recording medium 1. Then, light emitted from the light source 3 is projected on the entire surface of the magneto-optical recording medium 1. This energization and projection causes the temperature of the recording film surface of the magneto-optical recording medium 1 to rise to over 180° C. With this temperature rise, the coercive force of the magneto-optical recording medium 1 drops to less than 500 Oe, and the directions of magnetization of the information recording surface are all caused to be uniform in the direction of magnetic field given from the electromagnet 4. As a result, the information recorded on the magneto-optical recording medium 1 in pattern of magnetization is erased.

A common problem with this prior arrangement is that heat emitted from the single light source 3 is not enough to increase the temperature of the magneto-optical recording medium 1 uniformly over its entire surface.

In the case where the magneto-optical recording medium is in a double-face form shown in FIG. 10, the prior eraser is encounters with the following problem. As shown in FIG. 10, the double-face magneto-optical recording medium is composed of two transparent substrates 5, 6 of a resin such as polymetylmethacrylate (PMMA), polycarbonate (PC), etc., and a pair of magnetic layers 7, 8 formed a respective substrates 7, 8 so as to confront each other and which are attached to each other via an adhesive layer 9. When initializing this double-face magneto-optical recording medium or erasing information recorded thereon, magnetizations of the respective surfaces of the confronting magnetic layers 7, 8 must be in mutually opposite directions, as indicated by the arrows, to make codes of respective signal outputs during the reproduction of information equal. However, according to the conventional method, upon application of magnetic fields, magnetizations of the respective layer surfaces would be inconveniently in one and the same direction. Therefore the conventional method cannot be useful for erasing information recorded on a double-face magneto-optical recording medium.

SUMMARY OF THE INVENTION

It is therefore an object of this invention to provide a magneto-optical eraser which is capable of erasing information on the entire recording surface of a recording medium instantly and reliably without causing irregular erasing.

Another object of this invention is to provide a magneto-optical eraser which is capable of initializing a magneto-optical recording medium, either single-faced or double-faced, and of erasing information on such a magneto-optical recording medium.

According to a first aspect of this invention, there is provided a magneto-optical eraser for erasing information recorded on a magnetic layer of a magneto-optical recording medium, the magnetic layer having an axis of easy magnetization perpendicular to its surface, said eraser comprising:

(a) a reflector having a concave surface, or any the surface of a shape, suitable confronting one of the opposite surfaces of the magneto-optical recording medium;

(b) a plurality of light sources disposed inwardly of said surface of said reflector for applying light on the one surface of the magneto-optical recording medium directly and/or via said reflector to heat the magnetic layer;

(c) means for generating a magnetic field to be supplied to the magneto-optical recording medium along the axis of easy magnetization, and (d) auxiliary heating means for preheating the magneto-optical recording medium.

With the first arrangement, the magneto-optical recording medium is heated by light emitted from the light sources. A magnetic field is applied to the magneto-optical recording medium along the axis of easy magnetization by the magnetic field generating means. By this heat and magnetic field, information recorded on the magnetic layer of the magneto-optical recording medium is erased. Further, because of the plurality of light sources, it is possible to prevent non-uniform erasing that results from uneven light and hence uneven heat. Also, it is possible to reduce the intensity of light emitted from the light sources by using the auxiliary heating means, thus minimizing thermal impact that might be exerted on the magneto-optical recording medium.

According to a second aspect of this invention, there is provided a magneto-optical eraser for erasing information recorded on a double-face magneto-optical recording medium having a pair of magnetic layers, one on each side, each of the magnetic layers having an axis of easy magnetization perpendicular to its surface, said eraser comprising:

(a) a pair of reflectors each having a concave surface, or any other surface of a suitable shape, confronting a respective one of opposite surfaces of the double-face magneto-optical recording medium;

(b) a pair of light sources each disposed inwardly of said surface of each of said reflectors for applying light over the respective surface of the magneto-optical recording medium directly and/or via the respective reflector to heat the corresponding magnetic layer; and (c) a pair of magnetic field generating means each for generating a magnetic field to be supplied to the respective magneto-optical recording medium along the corresponding axis of easy magnetization.

With the second arrangement, light emitted from a plurality of light sources is applied to each surface of the double-face magneto-optical recording medium. Therefore initializing of the double-face magneto-optical recording medium and also erasing of information recorded thereon can be achieved.

According to a third aspect of this invention, there is provided a magneto-optical eraser for erasing information recorded on a double-face magneto-optical recording medium having a pair of magnetic layers, one on each side, each of the magnetic layers having an axis of easy magnetization perpendicular to its surface, said eraser comprising:

(a) a pair of reflectors each having a concave surface, or any other surface of a suitable shape, confronting a respective one of opposite surfaces of the double-face magneto-optical recording medium;

(b) a plurality of light sources disposed inwardly of said surface of each of said reflectors for applying light over the respective surface of the magneto-optical recording medium directly and/or via the respective reflector to heat the corresponding magnetic layer; and (c) a pair of magnetic field generating means each for generating a magnetic field to be supplied to the respective magnetooptical recording medium along the corresponding axis of easy magnetization.

With the third arrangement, the same results as in the foregoing arrangements can be obtained.

In the second arrangement, either magnetic layer can be selectively erased by applying light and a magnetic field with a selected set of the plurality light sources and magnetic field generating means, which set confronts one surface of the double-face magneto-optical recording medium.

The individual light source is a flash light source capable of emitting a brief dazzling light, for example. The light sources may be arranged in the following manner:

a) The light sources are arranged along a circle within the surface of the reflector.

b) The individual light sources are spaced different distances from the surface of the reflector.

The magnetic field generating means may be a electromagnet, in which case it is possible to apply a magnetic field in synchronism with the timing of the light emitted from the light source.

The above and other advantages, features and additional objects of this invention will be manifest to those versed in the art upon making reference to the following detailed description and the accompanying drawings in which several structural embodiments incorporating the principles of this invention are shown by way of illustrative example.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 is a schematic cross-sectional view of a magnetooptical eraser according to a second embodiment;

FIG. 4 is a plan view showing a set of light sources arranged in a reflector according to the second embodiment;

DETAILED DESCRIPTION

Figure 1:
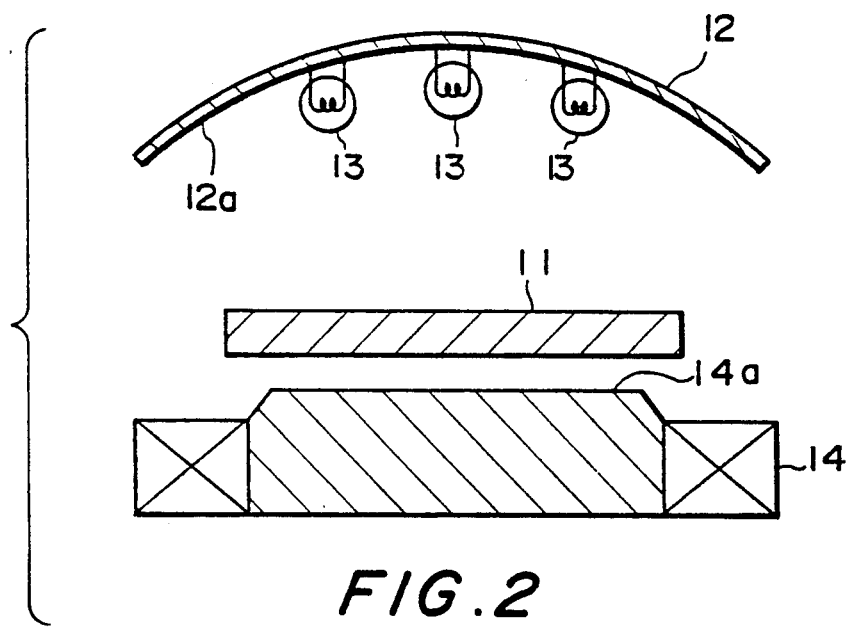
FIG. 1 is a schematic cross-sectional view of a magneto-optical eraser according to a first embodiment of this invention.
Figure 2:
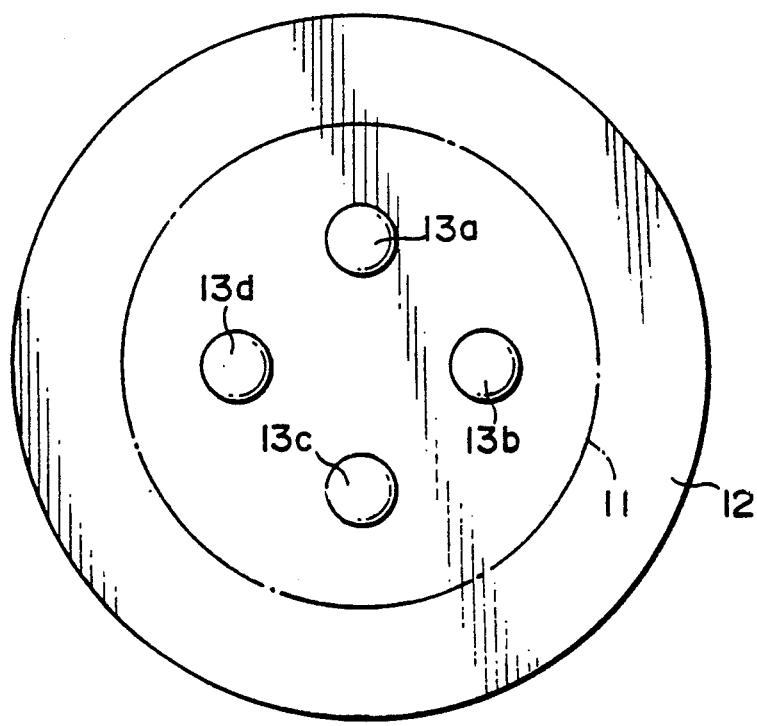
FIG. 2 is a plan view showing a set of light sources arranged in a reflector according to the first embodiment.

FIGS. 1 and 2 show a magneto-optical eraser according to a first embodiment of this invention.

In this magneto-optical eraser, a flat cylindrical electromagnet 14 is disposed at a position spaced a suitable distance from a parabolic surface 12a of a circular bowl-shaped reflector 12, or a reflector of any suitable shape, in such a manner that a magnetic pole 14a of the electromagnet 14 confronts the central portion of the reflector 12. A plurality of (four as shown in FIG. 1) flash light sources 13a, 13b, 13c, 13d are disposed centrally in the surface 12a of the reflector 12 for intermittently emitting brief dazzling lights. These light sources 13a, 13b, 13c, 13d are arranged at equal distances along an imaginary circle concentric with the peripheral edge of the reflector 12. The diameter of the reflector 12 is larger than the diameter of a magneto-optical recording medium 11. The magneto-optical recording medium 11 is disposed at a position spaced a suitable distance from the magnetic pole 14a of the electromagnet 14 so as to be parallel to the surface of the magnetic pole 14a. The light sources 13a, 13b, 13c, 13d are disposed on one and the same plane. Each of the light sources 13a, 13b, 13c, 13d emits a brief dazzling light to supply the magneto-optical recording medium 11 heat energy due to the light emission. This heat energy causes the temperature of the magneto-optical recording medium 11 to rise to over about 180° C. virtually uniformly throughout its entire surface. Further, the electromagnet 14 supplies a perpendicular magnetic field of over 5,000 Oe over the entire surface of the magneto-optical recording medium 11.

By this magneto-optical eraser, information recorded on the magneto-optical recording medium 11 is erased in the following manner.

Firstly the magneto-optical recording medium 11 from which recorded information is to be erased is placed close to the electromagnet 14 in parallel relation to the surface of the magnetic pole 14a. Then, the electromagnet 14 is energized to supply a perpendicular magnetic field of over 5,000 Oe over the entire surface of the magneto-optical recording medium 11.

Subsequently, the light sources 13a, 13b, 13c, 13d arranged on the interior side of the reflector 12 are flashed concurrently and instantaneously to increase the temperature of the information-recorded surface of the magneto-optical recording medium 11 uniformly to over 180° C. by the heat energy due to this flashing. Alternatively, the flashing may be repeated according to need. With this temperature rise, the coercive force of the magneto-optical recording medium 11 is lowered to less than 500 Oe, and the directions of magnetization of the information recording surface all are made to conform to the direction of magnetic field given from the electromagnet 14, namely, one direction. As a result, every information recorded on the magneto-optical recording medium 11 has been erased at once.

For preventing unnecessary temperature rise of the magneto-optical recording medium 11 over an upper limit, the emitting period of time of the light sources 13a, 13b, 13c, 13d is preferably as short as possible. For this purpose, it is desirable to use flash lamps capable of momentarily radiating large heat energy. Alternatively, the electromagnet 14 may be operable to produce a magnetic field only while the light sources 13a, 13b, 13c, 13d are emitting light.

FIGS. 3 and 4 show a magneto-optical eraser of a second embodiment. In this magneto-optical eraser, a plurality of (four shown in FIG. 4) light sources 23a, 23b, 23c, 23d are disposed on the interior side of a reflector 22 having a parabolic surface 22a, or any other surface of suitable shape. These light sources 23a, 23b, 23c, 23d are arranged at equal distances along an imaginary circle concentric with the peripheral edge of the reflector 22. Of these light sources 23a, 23b, 23c, 23d, a pair of light sources 23a, 23c opposed diametrically of the reflector 22 are disposed in a common plane, and another pair of diametrically opposed light sources 23b, 23d are disposed in a common plane different in level from the first-named plane. Namely, one pair of light sources 23a, 23c are spaced a relatively long distance from the magneto-optical recording medium 21, and the other pair of light sources 23b, 23d are spaced a relatively short distance from the same magneto-optical recording medium 21. The remaining construction of this magneto-optical eraser is identical with that of the first embodiment (FIGS. 1 and 2), and its description is omitted here for clarity.

In the second embodiment, information recorded on the magneto-optical recording medium 21 can be erased in the same manner as in the first embodiment. Additionally, with the arrangement of FIGS. 3 and 4, the intensity of light from the individual light sources 23a, 23b, 23c, 23d are made uniform as the light emitted from the light sources 23a, 23b, 23c, 23d are reflected by the reflector 22. As a result, the temperature of heating the magneto-optical recording medium 21 is uniform so that the temperature of the magneto-optical recording medium 21 can be made stable throughout its entire surface, thus minimizing the uneven erasing of the recorded information. Further, it is possible to prevent the magneto-optical recording medium 21 from curling due to heat.

Figure 5:
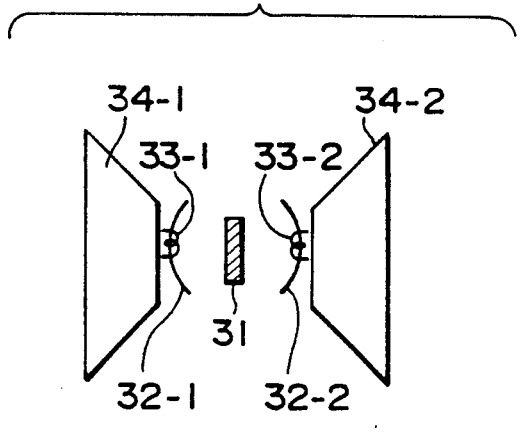
FIG. 5 is a schematic view showing a third embodiment.
Figure 8:
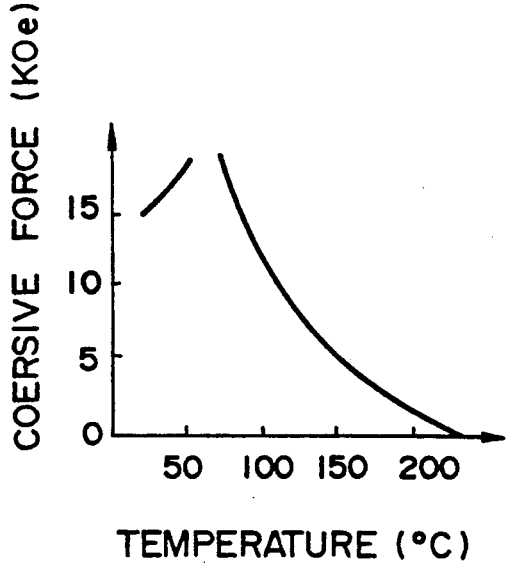
FIG. 8 is a characteristic curve graph showing a coercive force-temperature characteristic of a magneto-optical recording medium.
Figure 9:
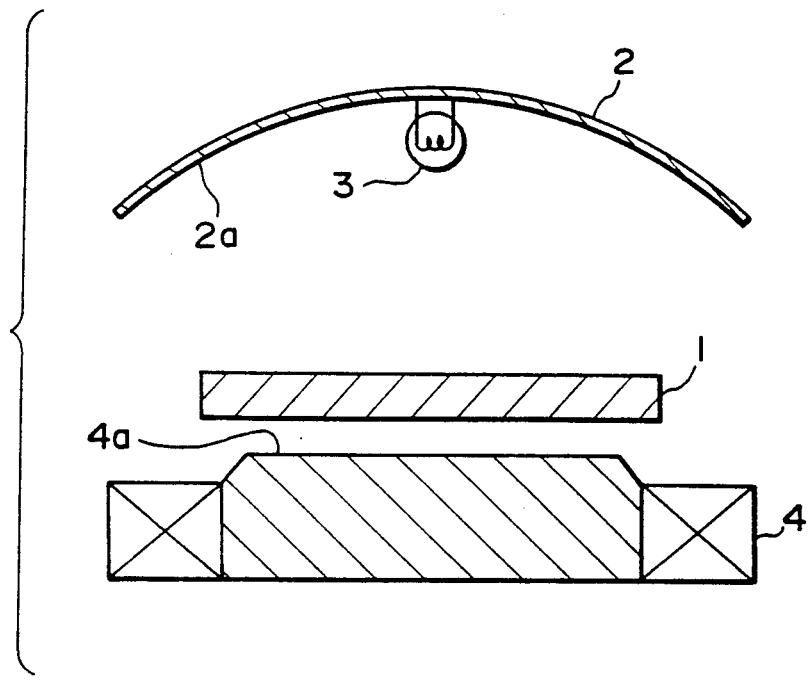
FIG. 9 is a schematic cross-sectional view of a typical conventional magneto-optical eraser.
Figure 10:
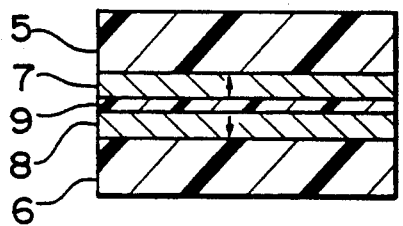
FIG. 10 is a fragmentary cross-sectional view of a double-face magneto-optical recording medium.

FIG. 5 shows a third embodiment, in which a flash light source 33 and an electromagnet 34 are located on either side of a magneto-optical recording medium 31. This magneto-optical recording medium 31 is of double-faced form as shown in FIG. 10. FIG. 8 is a characteristic curve graph showing the coercive force of the magnetic layer of this double-face magneto-optical recording medium 31 with respect to temperature.

In operation, firstly two electromagnets 34-1, 34-2 are energized concurrently to produce a magnetic field of about 3 kOe between the two electromagnets 34-1, 34-2. Then a flash light source 33-1 disposed on a front side of the double-face magneto-optical recording medium 31 is rendered operative to apply a flash light of a very short time (several msec to tens msec) over the front surface of the double-face magneto-optical recording medium 31. The front magnetic layer of the double-face magneto-optical recording medium 31 is thereby increased in temperature to about 200° C. so that its coercive force is reduced to 2 kOe. As a result, the directions of magnetization of the front magnetic layer have been conformed in the direction of the exterior magnetic field of 3 kOe; magneto-optical erasing has thus been conducted. During that time, since the other magnetic layer on the rear side of the double-face magneto-optical recording medium 31 is spaced from the front magnetic layer by an adhesive layer, the temperature of the rear magnetic layer does not rise to a temperature enough for magneto-optical erasing.

For conducting magneto-optical erasing over the rear magnetic layer of the double-face magneto-optical recording medium 31 the directions of current flow through the electromagnets 34-1, 34-2 are reversed to cause these electromagnets to produce a magnetic field of −3 kOe therebetween. Then the flash light source 33-2 on the rear side of the magneto-optical recording medium 31 is rendered operative to apply a flash light of a very short time over the rear surface of the double-face magneto-optical recording medium 31. The rear magnetic layer of the double-face magneto-optical recording medium 31 is increased in temperature to about 200° C. so that its coercive force is minimized to 2 kOe. As a result, the directions of magnetization of the rear magnetic layer have been conformed in the direction of exterior magnetic field of 3 kOe.

In the resulting double-face magneto-optical recording medium 31, the directions of magnetization of the front and rear magnetic layers are made mutually opposite so that codes of the respective reproduction signals at both sides become identical. Further, since generally, a transparent substrate is used for each substrate, light energy due to the application of flash light is hardly absorbed by the substrates. Still further, since the period of application of light is very short, the amount of energy absorbed by the magnetic layers is very small so as not to deform the substrates.

In the third embodiment, magneto-optical erasing of the double-face magneto-optical recording medium 31 is discussed. According to this invention, the same magneto-optical erasing operation for the rear magnetic layer of the double-face magneto-optical recording medium 31 may be conducted to erase information on a single-face magneto-optical recording medium.

Figure 6:
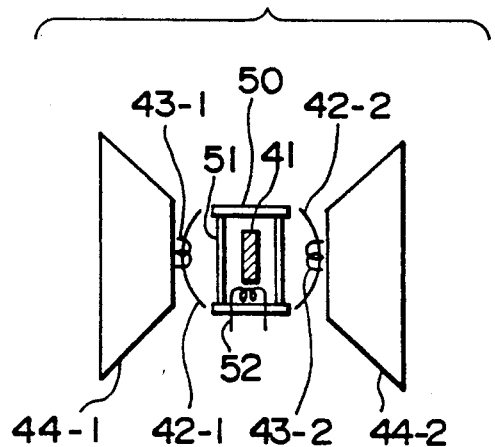
FIG. 6 is a schematic view showing a fourth embodiment.

According to a fourth embodiment of FIG. 6, a magneto-optical eraser is equipped with an auxiliary heating means. The auxiliary heating means is composed of a housing 50, a glass window 51, and a heater 52. For conducting magneto-optical erasing, firstly the heater 52 is energized in advance to increase the temperature of the interior of the housing 50 to a temperature less than the softening point of the substrate of a magneto-optical recording medium 41. Then two electromagnets 44-1, 44-2 are energized concurrently to produce a magnetic field of about 3 kOe therebetween.

Subsequently, two flash light sources 43-1, 43-2 are rendered operative selectively one at a time to apply a very brief dazzling light over the magneto-optical recording medium 41. The magnetic layer of the magneto-optical recording medium 41 is increased in temperature to about 200° C. so that its coercive force is reduced to 2 kOe. As a result, the directions of magnetization of the magnetic layer are conformed in the direction of exterior magnetic field of 3 kOe to complete magneto-optical erasing. In the case of a double-face magneto-optical recording medium, like the third embodiment, the direction of applying a magnetic field is reversed, and the opposite-side flash light source is operated.

With this arrangement, since the magnetic layer of the magneto-optical recording medium is preheated, it is possible to complete magneto-optical erasing with a shorter flash light or with a reduced intensity of flash light. As a result, thermal impact exerted on the magneto-optical recording medium is reduced. Therefore, this embodiment is particularly useful when applied to a magneto-optical recording medium that is sensitive to thermal impact.

Figure 7:
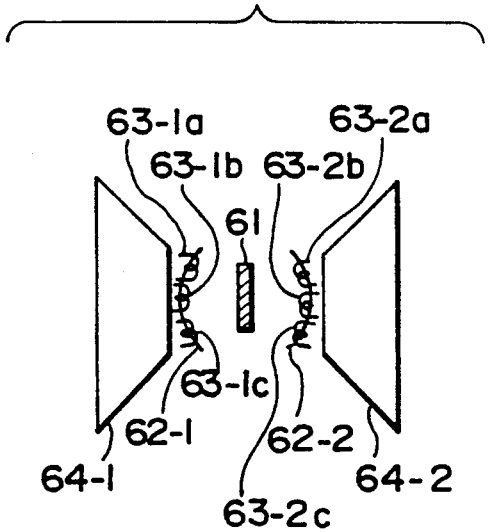
FIG. 7 is a view similar to FIG. 5, showing a fifth embodiment.

FIG. 7 shows a fifth embodiment, in which a plurality of (three shown in FIG. 7) light sources 63-1a, 63-1b, 63-1c; 63-2a, 63-2b, 63-2c are respectively disposed each on of two reflector 62-1, 62-2. With this embodiment, the same results as the third embodiment can be obtained. Also it is possible to minimize uneven erasing in particular.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical eraser for erasing information recorded on a magnetic layer of a magneto-optical recording medium having first and second opposing surfaces, the magnetic layer being disposed on the first opposing surface and having an axis of easy magnetization perpendicular rot the first opposing surface, the magneto-optical eraser comprising:
   (a) a reflector having a surface confronting the first opposing surface of the magneto-optical recording medium;
   (b) a plurality of light sources disposed inwardly of said surface of said reflector for applying light on the first opposing surface of the magneto-optical recording medium directly and via said reflector to heat the magnetic layer;
   (c) means for generating and emitting a magnetic field on to the magneto-optical recording medium along the axis of easy magnetization; and
   (d) auxiliary heating means, for preheating the magneto-optical recording medium, comprising housing means with glass windows within which the magneto-optical recording medium is mounted during erasing, heating means being disposed within said housing means for pre-heating the magneto-optical recording medium.

2. The magneto-optical eraser according to claim 1, wherein each of said light sources is a flash lamp for emitting a brief dazzling light.

3. The magneto-optical eraser according to claim 1, wherein said light sources are disposed on a imaginary circle inside said surface of said reflector.

4. The magneto-optical eraser according to claim 1, wherein said light sources are spaced form said surface of said reflector by different distances.

5. The magneto-optical eraser according to claim 1, wherein said magnetic field generating means in an electromagnet.

6. A magneto-optical eraser according to claim 5, wherein said magnetic field generating means is capable of generating a magnetic field in time synchronism with the light emitted from said light sources.

7. The magneto-optical eraser according to claim 1, wherein said reflector has a concave surface.

8. A magneto-optical eraser for erasing information recorded on a double-face magneto-optical recording medium having a pair of magnetic layers, one on each side of opposing surfaces of the double-face magneto-optical recording medium, each of the magnetic layers having an axis of easy magnetization perpendicular to a respective one of the opposing surfaces, the magneto-optical eraser comprising:
   (a) first and second reflectors each having a surface confronting a respective one of the opposing surfaces of the double-face magneto-optical recording medium;
   (b) a plurality of light sources mounted on said first and second reflectors for applying light over the opposing surfaces of the double-face magneto-optical recording medium directly and via said first and second reflectors, to heat the magnetic layers;
   (c) first and second magnetic field generating means for respectively generating and emitting first and second magnetic fields on to the opposing surfaces of the double-face magneto-optical recording medium along the corresponding axes of easy magnetization; and
   (d) auxiliary heating means, for preheating the double-face magneto-optical recording medium, comprising housing means with glass windows within which the double-face magneto-optical recording medium is mounted during erasing, heating means being disposed within said housing means for pre-heating the double-face magneto-optical recording means.

9. The magneto-optical eraser according to claim 8, wherein each of said light sources is a flash lamp for emitting a brief dazzling light.

10. The magneto-optical eraser according to claim 8, wherein said light sources are disposed along imaginary circles inside said surfaces of said first and second reflectors.

11. The magneto-optical eraser according to claim 8, wherein said light sources are spaced from said surfaces of said first and second reflectors by different distances.

12. The magneto-optical eraser according to claim 8, wherein said first and second magnetic field generating means are electromagnets.

13. The magneto-optical eraser according to claim 8, wherein said first ad second magnetic field generating means respectively generate first and second magnetic fields in time synchronism with the light emitted from said light sources.

14. The magneto-optical eraser according to claim 13, wherein one set of said light sources and a respective one of said first and second magnetic field generating means, which correspond to one of the opposing surfaces of the double-face magneto-optical recording medium, are operable depending on which of the magnetic layers is to be erased.

15. The magneto-optical eraser according to claim 8, wherein each of said first and second reflectors have concave surfaces.

* * * * *